Aug. 15, 1950 C. K. GRAVLEY 2,518,883

MEANS FOR AND METHOD OF MOISTUREPROOFING
A PIEZOELECTRIC CRYSTAL ELEMENT
Filed Aug. 29, 1947

INVENTOR.
CHARLES K. GRAVLEY
BY
Elias J. Hyde
ATTORNEY

Patented Aug. 15, 1950

2,518,883

UNITED STATES PATENT OFFICE 2,518,883

MEANS FOR AND METHOD OF MOISTURE-PROOFING A PIEZOELECTRIC CRYSTAL ELEMENT

Charles K. Gravley, Cleveland Heights, Ohio, assignor to The Brush Development Company, Cleveland, Ohio, a corporation of Ohio Application August 29, 1947, Serial No. 771,197

8 Claims. (Cl. 171—327)

Figure 1:
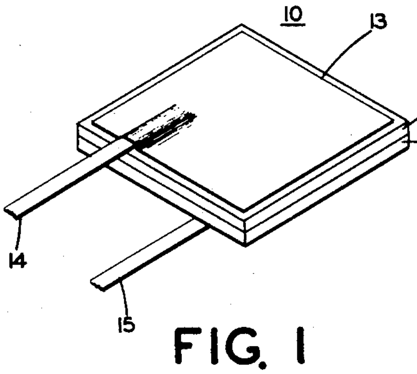

This invention pertains to electro-mechanical transducers and the method of making same, and more particularly to the moistureproofing of moisture-sensitive electro-mechanical transducers of the piezoelectric crystalline type.

Two very undesirable results may occur when a piezoelectric crystal unit becomes moist. The first is that certain types of crystalline materials such as Rochelle salt will rapidly dissolve in small amounts of moisture. The second is that if crystalline material such as Rochelle salt, primary ammonium phosphate, or the like, which has been formed into a piezoelectric unit having leads and electrodes, gets moist on the faces between the electrodes the moisture will conduct current and very materially reduce the effectiveness of the unit.

This surface moisture, whether the crystalline mater is water-soluble or not, may establish an electrically conductive shunt path between the electrodes, and if a voltage is impressed between the electrodes of the element the heat generated along this path might ruin the crystal. Further, if the unit is used as a generator, the shorting effect of the leakage path will reduce the low-frequency response of the system.

Heretofore, numerous means and methods have been proposed for rendering piezoelectric units less sensitive to moisture. One of them has been to dip the crystal plate, after the electrodes and leads have been put on, into a lacquer or shellac or wax compound in order to provide a thin film of moisture-resistant material over the entire surface of the unit.

Another method is explained in detail and claimed in the application for United States Letters Patent Serial Number 678,713, filed June 24, 1946 in the name of Frank Swinehart for a Moistureproof Piezoelectric Crystal and Method of Making Same, issued as Patent No. 2,483,677 on October 4, 1949, and assigned to the same assignee as the present application. This entails, in addition to dipping in moisture-resistant material, wrapping the crystal element in a metallic-foil sheath. Excellent results have been achieved by the Swinehart invention, leading to much increased use of piezoelectric crystals in very humid climates. However, as mentioned in the Swinehart application, this phenomenal increase in the life of the crystal element is not achieved without some disadvantage. It has been found that wrapping a thin piezoelectric crystal element in a metallic sheath loads the crystal with consequent reduction in the electrical or mechanical output of the crystal. For example, when a multiplate crystal element .030 inches thick and used as a voltage generator was covered with a thin layer of aluminum foil its output was reduced twenty percent. When the same crystal was covered with aluminum foil and used as a motor device in a hearing aid phone the loss was fifty percent. These losses were due to the stiffness of the metallic foil loading the thin multiplate crystal element.

It would be very desirable, therefore, to provide a piezoelectric crystal element of the type under consideration which is effectively moistureproofed by a metallic or other stiff jacket but in which the jacket stiffness does not load the crystal element.

It is an object of the invention to provide an improved electro-mechanical transducer of the type under consideration.

It is an object of the invention to provide an improved electro-mechanical transducer which is not subject to one or more of the above-mentioned disadvantages of prior-art devices.

A further object of the invention is to provide a highly moisture-resistant piezoelectric crystal having good electrical or mechanical output.

Another object of the invention is to provide a new and novel method of constructing a piezoelectric crystal unit.

In accordance with a feature of the invention, a moisture-resistant coating for a piezoelectric crystal element having a major face on a plate of the crystal material comprises, a layer of compliant material secured against and substantially covering the major face of the plate, and a layer of stiff moisture-resistant material secured against the layer of compliant material and surrounding the plate. The layer of compliant material substantially decouples the major face of the plate from the stiff moisture-resistant material.

In accordance with another feature of the invention, the method of constructing a moisture-resistant piezoelectric crystal unit comprises the steps of securing a layer of compliant material against at least a major face of a plate of piezoelectric crystalline material, and securing a layer of stiff moisture-resistant material against at least the layer of compliant material.

Figure 2:
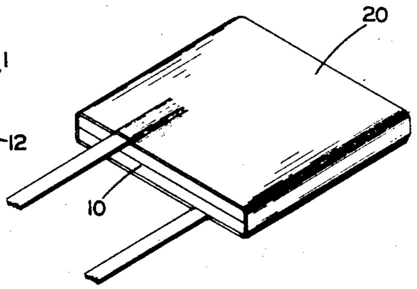
Figure 3:
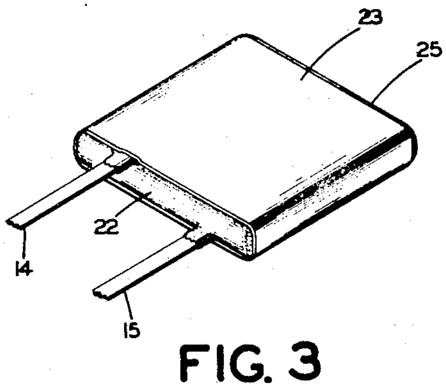
Figure 4:
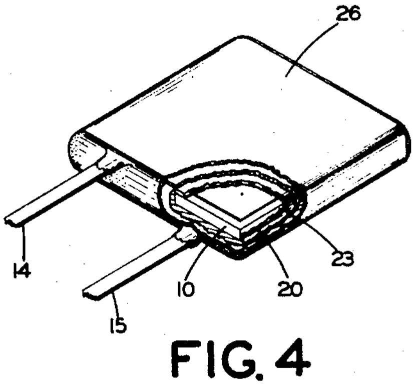

For a better understanding of the present invention, together with other and further objects thereof, reference is had to the following description taken in conjunction with the accompanying drawing:

In the single sheet of the drawing, Fig. 1 is an isometric view of a multiplate crystal element;

Fig. 2 is an isometric view of that element after the layer of compliant material has been applied; Fig. 3 is an isometric view of the unit shown in Fig. 2 after a metallic layer has been added; and Fig. 4 is an isometric view, partially broken away, showing the completed unit.

Referring now to the drawing, there is shown in Fig. 1 a piezoelectric crystal unit, identified generally by the reference character 10, which is comprised of two properly oriented slabs of piezoelectric crystalline material 11, 12 cemented together at their major faces. Preferably an inner electrode (not shown) is positioned between plates 11 and 12. A top electrode 13, preferably though not necessarily formed of metal foil, is cemented to the top face of the piezoelectric plate 11, and a lead extension 14 is positioned between the electrode 13 and the piezoelectric plate 11 making electrical contact with the electrode 13. On the bottom face of the piezoelectric plate 12 there is connected an electrode (not shown) similar to electrode 13, and a lead 15 is electrically connected to the bottom electrode in a manner similar to the manner in which lead 14 is connected to the electrode 13. Such a multiplate piezoelectric unit is well known in the art. For a more detailed description of the desired orientation of the several plates and other details of the construction, reference may be had to United States Letters Patent Re. 20,213 and Re. 20,680 granted on December 22, 1936 and March 29, 1938, respectively, to Charles B. Sawyer and assigned to the same assignee as the present application.

These multiplate elements, depending upon the orientation of the plates, may be termed "benders" or "twisters" and they may be electrically connected in parallel or in series. This invention is applicable to the parallel and the series-connected crystal plates of both the "bender" and the "twister" types. The element shown in the drawing is series connected. For parallel operation the two leads 14, 15 are connected together and a lead (not shown) is connected to the inner electrode.

After the element shown in Fig. 1 has been provided, the major or electrode faces thereof are covered with a thin layer of compliant material 20 such as gum rubber. A convenient way in which to cover the major faces of the crystal unit is to provide a length of thin rubber tubing which has been cut to a length substantially equal to or slightly greater than the length of the crystal element 10. The rubber tube is stretched and spread apart and the crystal element 10 is inserted into the tubing, after which the tubing is allowed to shrink around the crystal element. After the compliant material has been applied to at least the major faces of the piezoelectric element 10, the ends of the element which are not covered by the rubber tubing 20 are coated with wax 22 or other similar moisture-resistant and electrical insulating material thereby sealing the ends of the element. The element is then covered by a thin layer of a stiff moisture-resistant material 23 such as a metallic jacket. One method of applying the metallic material is to provide a length of thin aluminum foil which is wrapped around the major faces, the sides, and at least the back end 25 of the crystal element. Care must be exercised that the metallic foil does not touch both of the leads 14, 15, as to do so would cause a short circuit in the element.

It is preferable that the thin layer of compliant material 20 be connected to the crystal unit 10. Accordingly, any of a wide number of adhesives may be applied either to the face of the crystal or to the inner surface of the rubber tubing prior to the tubing being applied to the crystal unit. It is also preferable that the metallic coating be connected to the compliant material. Accordingly, any of the adhesives may be applied either to the outside surface of the compliant material or to a face of the foil.

Another method which may be utilized for covering the piezoelectric unit with a thin sheath of metal after the compliant material has been connected around it is to apply a thin coat of shellac or the like to the unit and to then coat it with an electrically-conducting material such as graphite. After this, the unit is electroplated to cause the deposition of a thin layer of metallic material such as copper, thereby effectively moistureproofing the crystal unit. Further details of this method may be found in Robinson Patent No. 2,456,995, assigned to the same assignee as the present invention.

After the application of the thin metallic coat either by wrapping in metallic foil or by electroplating, it is usually preferable to dip the crystal unit in shellac or chlorinated rubber 26, or any other known coating material to provide a protective coating on the surface of the metal to prevent damage due to corrosion. For a more detailed description of electroplating a piezoelectric crystal element, reference may be had to United States Letters Patent No. 2,402,531 issued to Dean Christian on June 25, 1946 and assigned to the same assignee as the present application.

Novel subject matter of this invention lies in the provision of a thin layer of compliant material between the piezoelectric crystal plates and the metallic moisture-resistant material, which, due to its stiffness, loads the crystal element thereby detrimentally affecting the output of the crystal element. By providing this thin layer of compliant material between the crystal element and the stiff metallic layer this metallic layer is substantially decoupled from the crystal unit; and, as the crystal unit vibrates, shear forces are easily set up in the compliant material and the stiff metallic coating is not substantially stressed. Previous to this invention the vibration of the crystal element would tend to stretch the metallic layer which was connected to the crystal element and due to the extremely high stiffness of the metallic layer the performance of the crystal would be greatly reduced.

In order to realize the maximum benefits in the use of piezoelectric crystals the stiffness of the thin metallic layer should not be greatly in excess of the stiffness of the crystal material and the stiffness of the compliant material positioned between the metal layer and the crystal element should be very low compared to the stiffness of the crystal material or of the metallic layer. This is best achieved by utilizing a thin layer of very compliant material such as gum rubber although, of course, a thicker layer of material having a slightly higher stiffness is permissible. Thus I have found that an excellent moistureproof piezoelectric element having a very high output can be fabricated by providing a multiplate piezoelectric crystal unit of either the "twister" or "bender" types which is approximately thirty thousandths of an inch in thickness, and applying to it compliant material which is about five thousandths of an inch thick. The thin metallic layer which surrounds the entire unit may be an electrolytically deposited layer of copper on the order of one to two ten-thousandths of an inch thick, or it may be aluminum foil on the order of three ten-thousandths of an inch thick.

It is not essential that a rubber tube, such as 20, be utilized. In other embodiments a rubber sack open at one end may be utilized into which the crystal element is placed with its leads extending out through the open end of the sack. The open end of the sack may then be folded around the leads and waxed shut thereby completely enclosing the crystal unit within a rubber bag. The same results may also be obtained by dipping the crystal unit 10 in a rubber cement prior to applying the metallic jacket.

It is not essential that the decoupling layer 20 extend along the thin edge faces of the crystal unit as experience and experimental tests have shown that if the top and bottom major faces of the crystal unit are decoupled from the stiff outer jacket a very substantial increase in the output of the unit is achieved.

Although the invention has been described with a certain degree of particularity it is to be understood that changes may be made without departing from the spirit and scope of the invention as hereafter claimed.

I claim:

1. A moisture-resistant coating for a piezoelectric crystal element having a major face, said element being adapted to alternately expand and contract in a direction parallel to the plane of said face, comprising, a layer of permanently compliant material secured against and substantially covering said major face, and a layer of stiff moisture-resistant material secured against said layer of compliant material and surrounding said element, said layer of compliant material substantially decoupling said major face from said stiff moisture-resistant material for motions in said plane.

2. A moisture-resistant coating in accordance with claim 1 in which said layer of compliant material is cemented to said major face and in which said stiff material is cemented to said compliant material.

3. A moisture-resistant coating for a piezoelectric plate of crystalline material adapted to alternately expand and contract in a direction parallel to the plane of a major face of said plate comprising, a layer of permanently compliant material secured against and substantially covering said plate, and a layer of stiff moisture-resistant material secured against said layer of compliant material and surrounding said plate, said layer of compliant material substantially decoupling said plate from said stiff moisture-resistant material for motions in said plane.

4. A moisture-resistant coating in accordance with claim 3 in which said piezoelectric crystal plate is included in a series-connected multiplate element and in which said compliant material is an electrical insulator.

5. A moisture-resistant coating in accordance with claim 3 in which the stiffness of said stiff material is substantially the same as the stiffness of said plate of crystalline material and in which the stiffness of said layer of compliant material is low compared to the stiffness of said stiff material.

6. A moisture-resistant coating in accordance with claim 5 in which said crystal plate is Rochelle salt about .030 inch thick, in which said compliant material is gum rubber about .005 inch thick, and in which said stiff material is aluminum foil about .0003 inch thick.

7. A moisture-resistant coating in accordance with claim 3 in which said compliant material is cemented to said crystal element and in which said stiff material is cemented to said compliant material.

8. The method of constructing a moisture-resistant piezoelectric crystal unit which comprises the steps of: securing a layer of permanenty compliant material against at least a major face of a plate of piezoelectric crystalline material and securing a layer of stiff moisture-resistant material against at least said layer of compliant material the thickness of said compliant material and its compliance being such that for motions parallel to the major face said layer of stiff material is substantially decoupled from said crystal unit.

CHARLES K. GRAVLEY.

REFERENCES CITED

The following references are of record in the file of this patent:

UNITED STATES PATENTS

| Number | Name | Date |
|---|---|---|
| 2,324,024 | Ream | July 13, 1943 |
| 2,386,279 | Tibbetts | Oct. 9, 1945 |
| 2,434,143 | Chilowsky | Jan. 6, 1948 |
| 2,456,995 | Robinson | Dec. 21, 1948 |